(12) United States Patent
Davies et al.

(10) Patent No.: US 10,286,826 B2
(45) Date of Patent: May 14, 2019

(54) VEHICLE FLOORING COMPONENT (71) Applicant: Ford Global Technologies, LLC, Dearborn, MI (US)

(72) Inventors: Bryn Arthur Davies, Novi, MI (US); Keith Brown, Riverview, MI (US); James Niemiec, Northville, MI (US); Babak Shahmehri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/658,788

(22) Filed: Jul. 25, 2017

(65) Prior Publication Data

US 2019/0031070 A1  Jan. 31, 2019

(51) Int. Cl.
| | | |
|---|---|---|
| *B60N 3/04* | (2006.01) |
| *B32B 5/18* | (2006.01) |
| *B60R 13/08* | (2006.01) |
| *B32B 27/06* | (2006.01) |
| *B32B 27/32* | (2006.01) |
| *B32B 27/40* | (2006.01) |

(52) U.S. Cl.
CPC ............ *B60N 3/044* (2013.01); *B32B 5/18* (2013.01); *B32B 27/065* (2013.01); *B32B 27/32* (2013.01); *B32B 27/40* (2013.01); *B60N 3/048* (2013.01); *B60R 13/083* (2013.01); *B32B 2266/0278* (2013.01); *B32B 2307/72* (2013.01); *B32B 2471/04* (2013.01); *B60N 3/046* (2013.01)

(58) Field of Classification Search
CPC .......... B60N 3/04; B60N 3/044; B60N 3/046; B60N 3/048; B60R 13/083; B32B 5/18; B32B 27/065; B32B 27/32; B32B 27/40

USPC ............ 296/39.1–39.3, 193.07, 187.09, 204
See application file for complete search history.

(56) References Cited

U.S. PATENT DOCUMENTS

| | | | | |
|---|---|---|---|---|
| 4,465,720 A | * | 8/1984 | Bell ................. | B60N 3/044 296/97.23 |
| 4,493,506 A | * | 1/1985 | Alexander ........ | B60R 13/04 293/128 |
| 4,508,774 A | * | 4/1985 | Grabhoefer ...... | C08G 18/42 428/220 |
| 4,747,636 A | * | 5/1988 | Harasaki .......... | B60R 22/04 280/756 |
| 4,898,419 A | * | 2/1990 | Kenmochi ........ | B62D 21/10 296/191 |
| 5,002,333 A | * | 3/1991 | Kenmochi ........ | B62D 21/10 296/204 |
| 5,129,700 A | * | 7/1992 | Trevisan ........... | B62D 25/025 296/193.03 |
| 5,178,434 A | * | 1/1993 | Krebs ............... | B60N 3/04 180/271 |

(Continued)

FOREIGN PATENT DOCUMENTS

| | | |
|---|---|---|
| DE | 102012014970 A1 | 1/2014 |
| EP | 1075985 A2 | 2/2001 |

*Primary Examiner* — Gregory A Blankenship
(74) *Attorney, Agent, or Firm* — Vichit Chea; Price Heneveld LLP (57) ABSTRACT

A vehicle includes a metallic floor pan. A plurality of trim components defining a foot well is proximate the floor pan. A flooring component is coupled with the floor pan which includes a polymeric structural layer. An insulation layer is positioned on the structural layer. A sealing layer is coupled with the floor pan and extends to seal the insulation layer against the structural layer.

18 Claims, 4 Drawing Sheets

(56) References Cited

U.S. PATENT DOCUMENTS

| | | | | |
|---|---|---|---|---|
| 5,573,294 A * | 11/1996 | Mack | B60N 3/042 | 16/4 |
| 5,601,899 A * | 2/1997 | Campbell | B60R 13/0206 | 24/297 |
| 6,790,520 B1 * | 9/2004 | Todd | B60R 13/02 | 428/318.4 |
| 6,817,649 B1 * | 11/2004 | Stanesic | B60N 3/044 | 296/97.23 |
| 6,976,731 B2 * | 12/2005 | Shibata | B60N 2/3011 | 296/203.03 |
| 7,055,893 B2 * | 6/2006 | Yamamura | B60N 3/066 | 296/187.08 |
| 7,070,848 B2 | 7/2006 | Campbell | | |
| 7,879,424 B2 * | 2/2011 | Smith | B60R 13/0243 | 296/1.08 |
| 8,163,369 B2 * | 4/2012 | Stanesic | B60N 3/044 | 296/39.1 |
| 8,186,735 B2 * | 5/2012 | Maceri | B62D 25/20 | 280/783 |
| 8,337,975 B2 | 12/2012 | Mally | | |
| 8,573,350 B2 * | 11/2013 | Abro | B60R 13/0892 | 180/315 |
| 9,431,923 B2 * | 8/2016 | Harada | H02M 1/32 | |
| 2005/0040675 A1 * | 2/2005 | Fitze | B62D 25/20 | 296/193.07 |
| 2005/0088014 A1 * | 4/2005 | Woodson | B60R 13/01 | 296/193.07 |
| 2006/0091695 A1 * | 5/2006 | MacNeil | B29C 47/0021 | 296/97.23 |
| 2007/0110950 A1 * | 5/2007 | Yang | A47L 23/266 | 428/95 |
| 2007/0114816 A1 * | 5/2007 | Hoelzel | B32B 5/28 | 296/204 |
| 2009/0091159 A1 * | 4/2009 | Gerish | B21D 53/88 | 296/193.07 |
| 2009/0230729 A1 * | 9/2009 | Lusk | B29C 70/443 | 296/193.07 |
| 2010/0272944 A1 * | 10/2010 | Engelhardt | A47L 23/22 | 428/68 |
| 2011/0233967 A1 * | 9/2011 | Ohtsubo | B60N 2/067 | 296/193.07 |
| 2013/0264843 A1 * | 10/2013 | Toba | B62D 21/02 | 296/204 |
| 2014/0117715 A1 * | 5/2014 | Ikeno | B60R 21/04 | 296/187.08 |
| 2014/0147617 A1 * | 5/2014 | Preisler | B62D 25/00 | 428/99 |
| 2015/0165951 A1 * | 6/2015 | Bouillon | B60N 3/066 | 296/187.08 |
| 2016/0200372 A1 * | 7/2016 | Ishii | B60R 13/011 | 296/193.07 |
| 2016/0311382 A1 * | 10/2016 | Murasawa | B60N 3/042 | |

* cited by examiner

VEHICLE FLOORING COMPONENT

FIELD OF THE INVENTION

The present disclosure generally relates to vehicles, and more particularly, to flooring components for a vehicle.

BACKGROUND OF THE INVENTION

Various vehicles are designed for off-road functionality, including the capability to be partially submerged in water. In some instances, water levels may reach above a scuff plate or door opening. When the doors are removed, water may enter the vehicle and cover the floor. Traditional flooring and insulation may become waterlogged and result in staining and/or the colonization of bacteria.

SUMMARY OF THE INVENTION

According to at least one feature of the present disclosure, a vehicle includes a metallic floor pan. A plurality of trim components defining a foot well is proximate the floor pan. A flooring component is coupled with the floor pan which includes a polymeric structural layer. An insulation layer is positioned on the structural layer. A sealing layer is coupled with the floor pan and extends to seal the insulation layer against the structural layer.

According to another feature of the present disclosure, a vehicle flooring system includes a metallic floor pan. A plurality of trim components defines a foot well. A flooring component is coupled with the trim components and is positioned on the floor pan. The flooring component includes a polymeric structural layer exposed to the foot well. A foam layer is coupled to the structural layer. A sealing layer is coupled with the floor pan and encapsulates the foam against the structural layer.

According to yet another feature of the present disclosure, a flooring component includes a polymeric structural layer defining a plurality of ribs on a first surface. A foam layer is coupled to a second surface of the structural layer and includes a urethane foam. A polymeric sealing layer is coupled with the structural layer and extends over the foam layer such that the flooring component is water tight.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1:
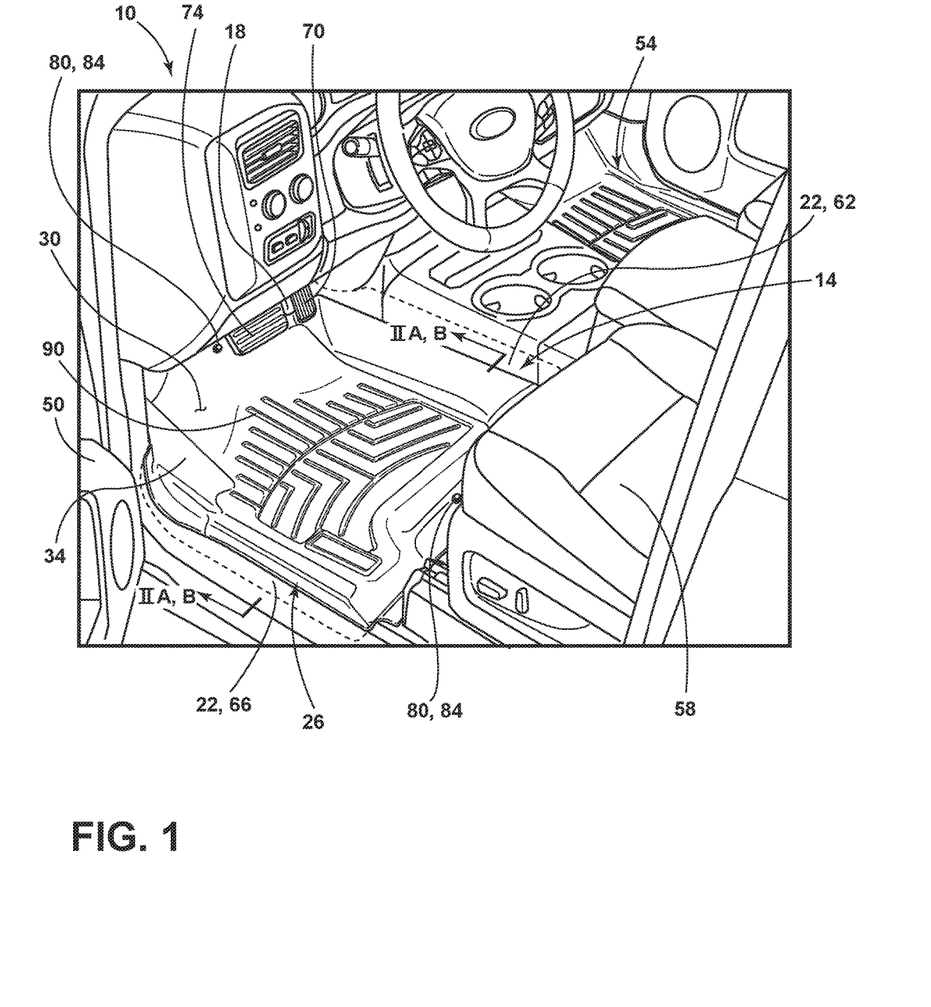
FIG. 1 is a perspective view of a vehicle interior, according to at least one example.
Figure 2A:
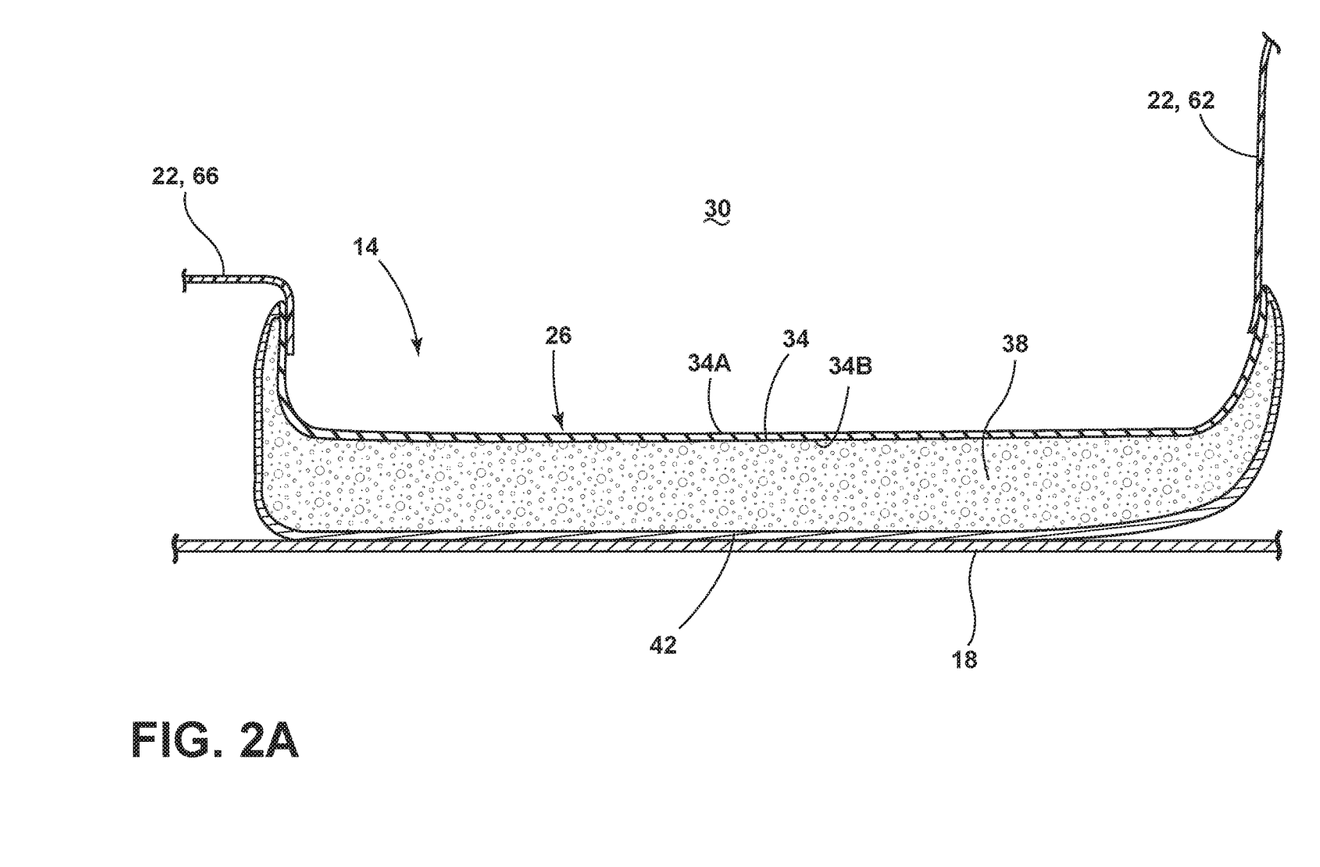
FIG. 2A is cross-sectional view taken along line IIA of FIG. 1, according to at least one example.
Figure 2B:
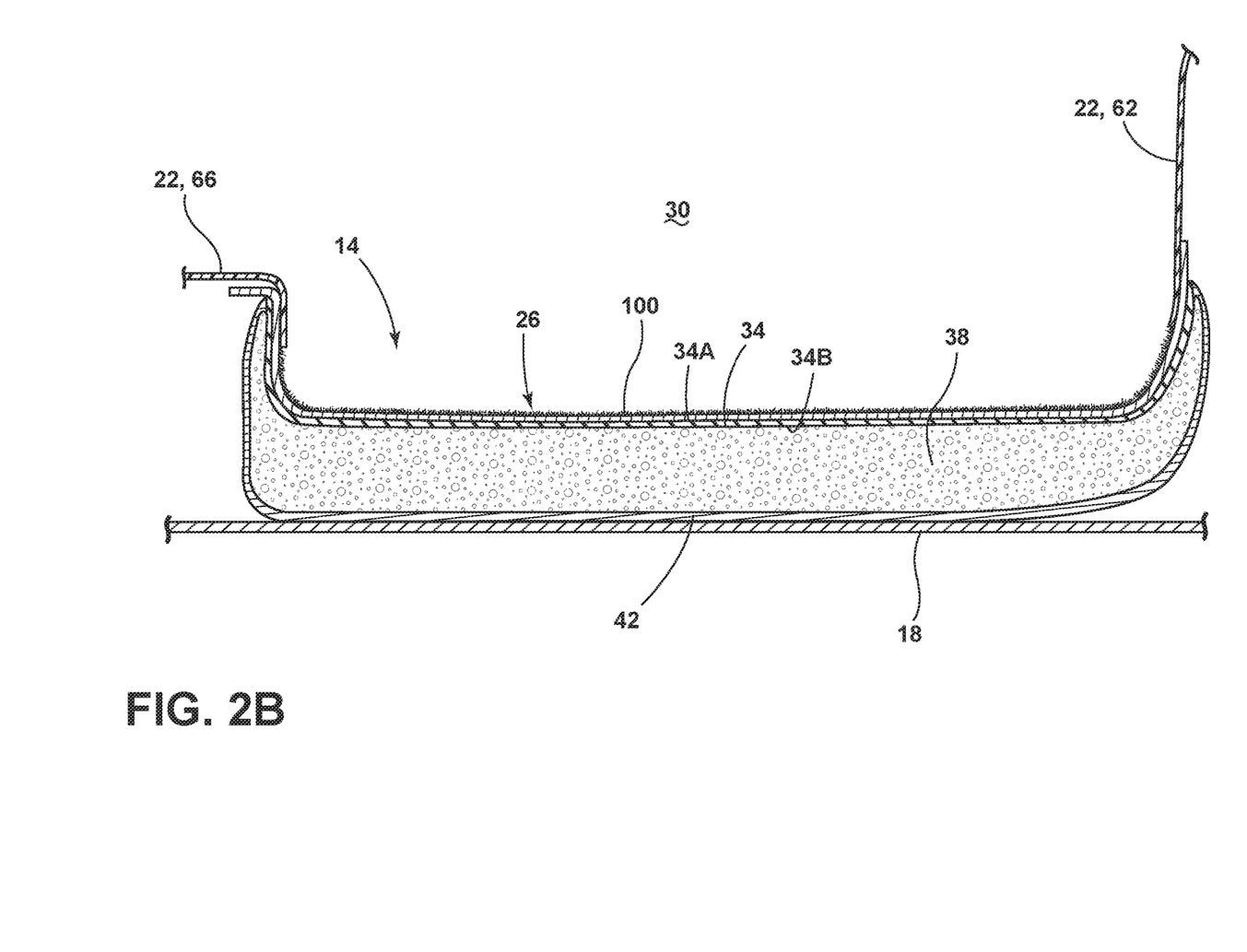
FIG. 2B is a cross-sectional view taken along line IIB of FIG. 1, according to at least one example.
Figure 3:
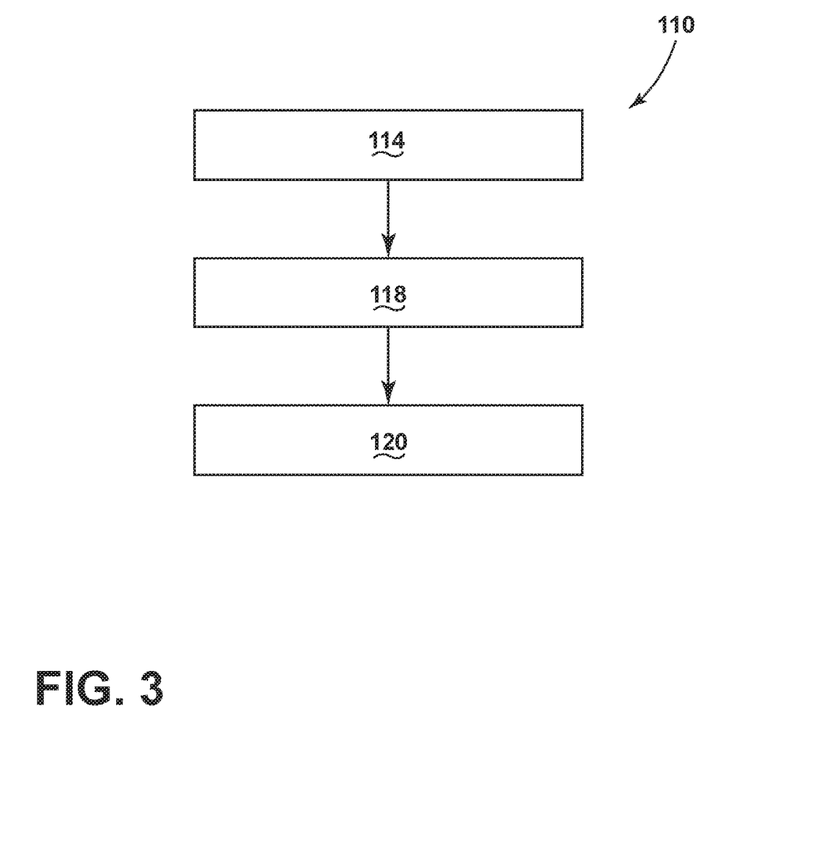
FIG. 3 is a schematic flowchart, according to at least one example.

Referring now to FIGS. 1-3, reference numeral 10 generally designates a vehicle. The vehicle 10 includes a flooring system 14. The flooring system 14 includes a floor pan 18, one or more trim components 22 and a flooring component 26. The flooring system 14 and/or a plurality of the trim components 22 defining a foot well 30 proximate the floor pan 18. The flooring component 26 may be coupled with the floor pan 18. The flooring component 26 may include a structural layer 34, an insulation layer 38 positioned on the structural layer 34, and an optional sealing layer 42 coupled with the floor pan 18 and extending to seal the insulation layer 38 against the structural layer 34.

Referring now to FIG. 1, the vehicle 10 may take a variety of configurations which may be utilized both on legal streets as well as in off-road conditions. For example, the vehicle 10 may be a sport utility vehicle, a pickup truck, a crossover, a sedan, a van, other types of vehicles and/or combinations thereof. Depending on the type of vehicle 10, a plurality of doors 50 may be positioned around the vehicle 10 which allows access to an interior 54 of the vehicle 10. The vehicle 10 may be operated in a "doors-on" configuration (FIG. 1) or a "doors-off" configuration. In the doors-off configuration, one or more of the doors 50 may be removed from the vehicle 10 such that the interior 54 is exposed to an environment around the vehicle 10. In the doors-off configuration, water, moisture, dirt and/or crime may enter the interior 54 of the vehicle 10 and deposit on the flooring system 14. For example, the vehicle 10 may be taken through a river during off-roading or a puddle on a legal road which may result in water or moisture accumulating on the flooring system 14.

The flooring system 14 is configured to support a variety of components within the interior 54 of the vehicle 10. For example, the flooring system 14 (e.g., the floor pan 18) may support one or more seating assemblies 58 positioned throughout the vehicle 10. Seating assemblies 58 positioned in a front or first row within the interior 54 of the vehicle 10 may be known as bucket, or standalone, seats while seating assemblies 58 position a second or third row of the vehicle 10 may be bench seats, jump seats and/or bucket seats. The flooring system 14 may further support one or more instrument panels, center consoles, trunk floors. The flooring system 14 may extend over a portion, a majority or substantially all of the vehicle 10. For example, the flooring system 14 may have full coverage across the vehicle 10. The flooring system 14, while having the floor pan 18 extending throughout the vehicle 10, may be divided into a plurality of smaller sections by the flooring components 26. In other words, each of the flooring components 26 may form a section of the flooring system 14. It will be understood that the flooring system 14 may or may not be free of flooring components 26 at connection points between the seating assemblies 58, instrument panels and/or center consoles and the flooring system 14.

The foot well 30 is defined within the interior 54 of the vehicle 10. Although depicted as a driver foot well, the foot well 30 may be positioned in a variety of locations of the interior 54 of the vehicle 10. For example, the foot well 30 may be a passenger front foot well, a second or third row seating row foot well, or combinations thereof. Examples where the foot well 30 is a second and/or third row seating foot well, the foot well 30 may extend from a driver-side to a passenger-side of the vehicle 10. The foot well 30 may be defined by the plurality of trim components 22, the flooring component 26, one or more of the seating assemblies 58 and/or combinations thereof. The trim components 22 may include console valences 62, scuff plates 66 as well as other trim components 22 positioned in and/or around the foot well 30. According to some examples, the foot well 30 may further be at least partially defined by a panel positioned on one of the doors 50. In examples of the foot well 30 of the driver side of the vehicle 10, an accelerator pedal 70 and/or a brake pedal 74 may extend into the foot well 30. As such, the flooring component 26 is positioned below the accelerator pedal 70.

Referring now to FIGS. 1 and 2, as explained above, the flooring system 14 includes the floor pan 18, the trim components 22 and the flooring component 26. The floor pan 18 may extend across a portion, majority, substantially all or all the floor of the vehicle 10. According to various examples, the floor pan 18 may be defined as part of a body of the vehicle 10 or may be a separate component. The floor pan 18 may be composed of a metal, a polymer, a composite material and/or combinations thereof. The floor pan 18 may aid in defining the interior 54 of the vehicle versus an exterior, or environment, around the vehicle 10. According to various examples, the floor pan 18 defines one or more attachment features 80 positioned across the floor pan 18. The attachment features 80 may be coupled to and/or integrally defined by the floor pan 18. The attachment features 80 extend in a vehicle upward direction from the floor pan 18. The attachment features 80 may include weld studs, mechanical fasteners, adhesives and/or combinations thereof. Examples of the attachment features 80 including weld studs, the weld studs may be threaded or otherwise configured to receive a retention feature 84 thereon. In some examples, the attachment features 80 may be positioned in only one foot well 30 (e.g., the foot well 30 of the driver).

As explained above, the flooring components 26 of the flooring system 14 are configured to form a plurality of sections on the flooring system 14. The flooring components 26 may be removably coupled to the flooring system 14 such that individual flooring components 26 may be removed from the vehicle 10. When all of the flooring components 26 are coupled to the flooring system 14, the flooring system 14 may provide full floor coverage of the vehicle 10. As will be explained in greater detail below, one or more of the flooring components 26, when coupled with the flooring system 14, may be overlapped or underlapped (e.g., as shown in phantom on FIG. 1) with one or more of the trim components 22. In other words, one or more of the flooring component 26 may tuck under one or more of the trim components 22. In examples where the flooring component 26 is positioned within a foot well 30 the second row of the assemblies, a single flooring component 26 may extend fully between the driver-side and passenger-side of the vehicle 10. In such an example, the flooring component 26 may extend at least partially underneath seating assemblies 58 in the first row seating.

Each of the flooring components 26 may have a variety of mechanical, acoustical and material properties. The flooring components 26 may have a thickness from about 5 mm to about 45 mm. For example, the flooring components 26 a thickness of about 10 mm or greater, about 15 mm of greater, about 20 mm or greater, about 25 mm or greater, about 30 mm or greater, about 35 mm or greater, or about 40 mm or greater. It will be understood that one or more of the flooring components 26 may be different (e.g., in thickness, size, material composition, etc.) than the other flooring components 26 without departing from the teachings provided herein. The flooring components 26 are configured to reduce at least one of a noise, vibration or harshness (NVH) which may be transmitted through the flooring component 26. Reduction of the NVH transmitted through the flooring component 26 may be advantageous in decreasing at least one of road noise, tire noise, vibration and/or vehicle noises from entering the interior 54 of the vehicle 10. According to various examples, the insulation layer 38 may contain one or more materials configured to reduce the noise, vibration and/or harshness through the flooring component 26. As will be explained in greater detail below, the flooring components 26 may be water resistant, watertight and/or waterproof such that exposure to moisture, water does not result in damage to the flooring component 26.

One or more of the flooring components 26 is configured to couple with at least one of the trim components 22. According to some examples, the trim components 22 may overlap flooring component 26 while in other examples, the flooring component 26 may overlap the trim component 22. The underlap or overlap of the trim components 22 relative to the flooring component 26 may be about 1 mm or greater, about 2 mm or greater, about 3 mm or greater, about 4 mm or greater, about 5 mm or greater, about 6 mm or greater, about 7 mm or greater, about 8 mm or greater, about 9 mm or greater, about 10 mm or greater, or about 15 mm or greater. For example, the flooring component 26 may underlap, or be overlapped by, the console valence 62 and/or the scuff plate 66 from about 6 mm to about 8 mm. According to various examples, the flooring component 26 may not be overlapped or underlapped at locations proximate a firewall of the vehicle 10. For example, the firewall which is vehicle forward of the accelerator pedal 70 and brake pedal 74 may be covered by the flooring component 26. In such an example, the flooring components 26 may extend in a vehicle upward direction above the accelerator pedal 70. According to various examples, the flooring component 26 extends away from the floor pan 18 at angle of about 5° or greater, about 10° or greater, about 15° or greater, about 20° or greater, about 30° or greater, about 40° or greater, about 50° or greater, about 60° or greater, about 70° or greater, about 80° or greater, or about 90° or greater. As the flooring component 26 may extend in an upper direction away from the floor pan 18, the floor component 26 may extend up sides of the foot well 30 which traditionally have been covered by trim components 22.

According to various examples, the flooring component 26 is removably, coupled with the floor pan 18. As explained above, the floor pan 18 may define one or more attachment features 80. In examples where the attachment features 80 include weld studs, the flooring component 26 may define one or more apertures to allow the weld stud to pass through the flooring component 26. The retention features 84 are configured to engage the attachment features 80 such that the flooring component 26 is secured to the floor pan 18. The retention features 84 may include nuts (e.g., push on/spin off wing nut fasteners), adhesives, mechanical fasteners and the like which are configured to engage the attachment features 80 and thereby secure the flooring component 26 against the floor pan 18. In an additional example, the attachment features 80 and retention features 84 may each include at least one of a hook and loop retention system (e.g., Velcro) with the attachment feature 80 positioned on the floor pan 18 and the retention feature 84 positioned on a bottom side of the flooring component 26. In examples where the attachment features 80 include weld studs, a weld stud may couple the flooring component 26 to the floor pan 18 proximate the accelerator pedal 70. In such an example, the weld stud may be positioned about 300 mm or less, about 200 mm or less, about 100 mm or less, about 80 mm or less, about 60 mm or less, about 40 mm or less, about 20 mm or less, or about 10 mm or less in straight line distance from the accelerator pedal 70 to the location where the weld stud protrudes through the flooring component 26. Examples where the attachment feature 80 is proximate the accelerator and/or brake pedal 70, 74 may be advantageous in increasing safety by decreasing the amount of mobility of the flooring component 26 proximate the accelerator and/or brake pedal 70, 74. Examples where the attachment feature 80 (e.g., a weld stud) is positioned proximate the accelerator and/or brake pedal 70, 74, an additional attachment feature 80 may be positioned proximate the driver seating assembly 58 such that the flooring component 26 may be equally retained at both ends. It will be understood that the retention features 84 may be easily applied and removed from the attachment features 80 such that the user of the vehicle 10 may remove the flooring components 26 from the vehicle 10 with ease.

Referring now to FIG. 2, the flooring component 26 is composed of a layered structure including the structural layer 34. The structural layer 34 may define a first surface 34A and a second surface 34B. The first surface 34A of the structural layer 34 is exposed to the foot well 30 and defines a surface on which occupants rest their feet. The structural layer 34 may be composed of a metal, a polymer, a fabric, a composite material and/or combinations thereof. In polymeric examples of the structural layer 34, the polymeric material may include a thermoplastic olefin material. Thermoplastic olefin may refer to a polymer/filler blend including some fraction of a thermoplastic, an elastomer or rubber, and optionally a filler material. Thermoplastics may include polypropylene (PP), polyethylene (PE), block copolymer polypropylene (BCPP), other polymers and combinations thereof. Inclusion of an elastomer and/or a rubber in the thermoplastic olefin can be advantageous in allowing the structural layer 34 to both provide a rigid surface while also allowing flexibility to be tucked under the trim components 22. Other exemplary polymeric materials may include a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, a polybenzimidazole and/or combinations thereof. According to some examples, the structural layer 34 may include one or more fibers for enhanced strength and/mechanical properties. Exemplary fibers may be composed of carbons, aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses.

The structural layer 34 may have a durometer hardness of about 10 or greater, about 20 or greater, about 30 or greater, about 40 or greater, about 50 or greater, but 60 or greater, about 70 or greater, about 80 or greater, about 90 or greater, about 100 or greater, about 120 or greater, about 140 or greater, about 160 or greater, or about 180 or greater. The structural layer 34 may have a thickness from the first surface 34A to the second surface 34B of from about 1 mm to about 5 mm. For example, the structural layer 34 may have a thickness of about 1 mm, about 2 mm, about 3 mm, about 4 mm, or about 5 mm. According to various examples, the structural layer 34 may define one or more reinforcement ribs 90 (FIG. 1). The reinforcement ribs 90 may be defined on the first surface 34A of the structural layer 34 and are configured to provide increased rigidity and structural stability to the structural layer 34. It will be understood that additionally or alternatively, the structural layer 34 and/or the reinforcement ribs 90 may define an egg crate lattice structure which may increase the structural stability of the flooring component 26.

The insulation layer 38 is configured to reduce the NVH transmitted through the flooring component 26. The insulation layer 38 is coupled to the second surface 34B of the structural layer 34. In other words, the insulation layer 38 is positioned between the structural layer 34 and the sealing layer 42. The insulation layer 38, as well as the sealing layer 42, may extend a full length of the structural layer 34. In yet other examples, a portion of the second surface 34B of the structural layer 34 may be left exposed. The insulation layer 38 may have a thickness of from about 1 mm to about 30 mm. For example, the thickness of the insulation layer 38 may be about 1 mm or greater, about 5 mm or greater, about 10 mm or greater, about 15 mm or greater, about 20 mm or greater, about 25 mm or greater, or about 30 mm or greater. It will be understood that the thickness of the insulation layer 38 may be uniform, or the thickness may vary across the flooring component 26. It will be understood that the thickness of the insulation layer 38 may be different across the different flooring components 26. For example, flooring components 26 positioned over high NVH areas (e.g., transmission tunnel) may have a greater thickness of insulation to compensate for increased NVH of the vehicle 10 in that location. According to various examples, the insulation layer 38 may include a foam. In some examples, the foam of the insulation layer 38 may include a urethane foam. Foam examples of the insulation layer 38 may include an open-celled foam, a closed-cell foam, or combinations thereof. In some examples, a "self-skinning" foam may be utilized. For purposes of this disclosure, "self-skinning" may mean that the cured foam forms a continuous high density skin. Such self-skinning examples of foam may be advantageous in that the sealing layer 42 may become optional. Foam examples of the insulation layer 38 may have a density of about 10 kg/m$^3$ or greater, about 20 kg/m$^3$ or greater, about 30 kg/m$^3$ or greater, about 40 kg/m$^3$ or greater, about 50 kg/m$^3$ or greater, about 60 kg/m$^3$ or greater, or about 70 kg/m$^3$ or greater. The insulation layer 38 may provide sound absorption and dampening by decoupling the structural layer 34 from the floor pan 18.

The sealing layer 42 may be configured to seal, encapsulate or otherwise render the flooring component 26 substantially impervious to water and/or moisture. The sealing layer 42 may have a thickness of from about 0.0254 mm (0.001 inch) to 5 mm (0.2 inch). For example, the sealing layer 42 may have a thickness of about 0.0254 mm or greater, about 0.5 mm or greater, about 1 mm or greater, about 2 mm or greater, about 5 mm or greater, about 6 mm or greater, or about 10 mm or greater. The thickness of the sealing layer 42 should be sufficient that the sealing layer 42 is substantially tear-proof. The sealing layer 42 may be composed of a polymeric and/or an elastomeric material. According to various examples, the sealing layer 42 may be composed of polyethylene. The sealing layer 42 is coupled with both the insulation layer 38 and the structural layer 34. The sealing layer 42 may couple with the structural layer 34 such that the insulation layer 38 is fully surrounded and/or encapsulated within the flooring component 26. As explained above, the sealing layer 42 is configured to form a watertight seal around the insulation layer 38. As such, the sealing layer 42 fully extends over the insulation layer 38 and may be in contact with the floor pan 18. For purposes of this disclosure, the term "watertight" may mean formation of a seal which may partially, substantially or completely resist the penetration of water for a period of several hours. For example, the sealing layer 42 may couple with the structural layer 34 such that a watertight seal is sufficient to allow the flooring component 26 to be fully submerged within water at a depth (e.g., about 2 meters or less) for a predefined time period (e.g., about 1 hour or less).

Referring now to FIG. 2B, the flooring component 26 may include a carpet layer 100. The carpet layer 100 may be composed of a die-cut or pre-molded piece of carpeting which has had the structural layer 34 formed on its back. In other words, the carpet layer 100 may be positioned on a first surface 34A of the structural layer 34. The carpet layer 100 may take a variety of sizes, shapes and colors configured to provide an aesthetically pleasing appearance and feel to the interior 54 of the vehicle 10.

Referring now to FIG. 3, depicted is an exemplary method 110 of forming the flooring component 26. The method 110 begins with a step 114 of injection molding the structural layer 34 using an injection molding machine. According to various examples, the structural layer 34 is formed by an injection molding process. During the injection molding process, a mold is closed and the material of the structural layer 34 is injected in. Injection molding of the structural layer 34 may be advantageous in providing a more detailed structure with a lower weight and tighter design tolerances. For example, formation of the reinforcement ribs 90 and/or the egg crate lattice may have a tighter design tolerance values when using injection molding. As explained above, if the flooring component 26 includes the carpet layer 100, the carpet layer 100 may be placed within the mold of the injection molding machine such that the structural layer 34 is directly formed on a back side of the carpet layer 100.

Next, a step 118 of coupling the insulation layer 38 to the structural layer 34 is performed. In foam examples of the insulation layer 38, step 118 may be carried out by injecting the foam onto formed structural layer 34. The application of the insulation layer 38 to the structural layer 34 may be performed in the same tool as the structural layer 34 was formed, or the insulation layer 38 may be applied in a different tool. Further, in non-foam examples of the insulation layer 38, the insulation layer 38 may be mechanically, adhesively or otherwise coupled to the structural layer 34.

Next, a step 122 of sealing or coupling the sealing layer 42 to the structural layer 34 of the flooring component 26 is performed. As explained above, the sealing layer 42 may be a polymeric material configured to seal, encapsulate, or otherwise make the flooring component 26 water tight. As such, the sealing layer 42 may be sealed around the insulation layer 38 via heat staking, thermal bonding, adhesive bonding, mechanical bonding and other methods of bonding which may produce a water tight seal. According to various examples, the sealing layer 42 is added to the injection molding tool which forms the structural layer 34.

Use of the present disclosure may offer a variety of advantages. First, formation of the flooring component 26 and its coupling to the flooring system 14 may allow for an easy to remove flooring for the vehicle 10. Second, as the flooring components 26 may be water tight, or impervious to water, the flooring system 14 may be exposed to water without the fear of degrading the flooring system 14 as the flooring components 26 may be removed to allow water to dry or escape from the flooring system 14. Third, as the flooring components 26 are removable from the flooring system 14 and the vehicle 10, the flooring components may be removed prior to water exposure to the interior 54 of the vehicle 10. Fourth, as the flooring components 26 include the insulation layer 38, NVH may be reduced within the interior 14 of the vehicle 10 while also providing a flooring system 14 which may resist water exposure.

According to various embodiments, a vehicle includes a metallic floor pan, a plurality of trim components defining a foot well proximate the floor pan, and a flooring component coupled with the floor pan. The flooring component including a polymeric structural layer, an insulation layer positioned on the structural layer, and a sealing layer coupled with the floor pan and extending to seal the insulation layer against the structural layer. Embodiments of the vehicle can include any one or a combination of the following features:

at least one of the plurality of trim components overlaps the flooring component by about 3 mm or greater;
  an accelerator pedal, wherein the flooring component is positioned below the accelerator pedal;
  a weld stud couples the flooring component to the floor pan at a distance of about 100 mm or less from the accelerator pedal;
  a carpet layer positioned on the polymeric structural layer;
  the structural layer defines at least one rib;
  the polymeric structural layer comprises a thermoplastic olefin;
  the insulation layer comprises a foam layer;
  a density of the foam layer is about 25 kg/m$^3$ or greater;
  the foam layer comprises open-celled foam;
  the foam layer comprises closed-celled foam;
  the foam layer comprises a urethane foam;
  the sealing layer is configured to form a water tight seal around the insulation layer; and/or
  at least one of the plurality of trim components overlaps the flooring component.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

What is claimed is:

1. A vehicle, comprising:
a metallic floorpan;
a plurality of trim components defining a foot well proximate the floor pan;
an accelerator pedal; and
a flooring component coupled with the floor pan, comprising:
a polymeric structural layer;
a foam layer positioned on the structural layer; and
a sealing layer coupled with the floor pan and extending over the foam layer to seal the foam layer against the structural layer;
wherein the flooring component is positioned below the accelerator pedal and wherein a weld stud couples the flooring component to the floor pan at a distance of about 100 mm or less from the accelerator pedal.

2. The vehicle of claim 1, further comprising:
a carpet layer positioned on the polymeric structural layer.

3. The vehicle of claim 1, wherein the sealing layer is configured to form a water tight seal around the insulation layer.

4. The vehicle of claim 1, wherein the structural layer defines at least one rib.

5. The vehicle of claim 1, wherein the flooring component extends away from the floor pan at an angle of about 20° or greater.

6. The vehicle of claim 1, wherein a console valence overlaps the flooring component.

7. The vehicle of claim 1, wherein at least one of the plurality of trim components overlaps the flooring component by 3 mm to 15 mm.

8. A vehicle flooring system, comprising:
a metallic floor pan;
a plurality of trim components defining a foot well; and
a flooring component coupled with the trim components and positioned on the floor pan, comprising:
a polymeric structural layer exposed to the foot well;
a foam layer coupled to the structural layer; and
a sealing layer coupled with the floor pan and encapsulating the foam against the structural layer to seal the foam layer against the structural layer.

9. The system of claim 8, wherein the polymeric structural layer comprises a thermoplastic olefin.

10. The system of claim 8, wherein a density of the foam layer is about 25 kg/m$^3$ or greater.

11. The system of claim 8, wherein the foam layer comprises open-celled foam.

12. The system of claim 8, wherein the foam layer comprises closed-celled foam.

13. The system of claim 8, wherein the foam layer comprises a urethane foam.

14. A flooring component, comprising:
a polymeric structural layer defining a plurality of ribs on a first surface;
a foam layer coupled to a second surface of the structural layer and comprising a urethane foam; and
a polymeric sealing layer coupled with the structural layer and extending over the foam layer, the sealing layer and the structural layer forming a water tight enclosure around the foam layer.

15. The component of claim 14, wherein the polymeric sealing layer comprises polyethylene.

16. The component of claim 14, wherein the foam layer and the sealing layer extend fully across the structural layer.

17. The component of claim 14, wherein a density of the foam layer is about 40 kg/m$^3$ or greater.

18. The component of claim 14, wherein the polymeric structural layer comprises a thermoplastic olefin.

* * * * *